US011455204B1

(12) United States Patent
Nadger et al.

(10) Patent No.: US 11,455,204 B1
(45) Date of Patent: Sep. 27, 2022

(54) PROACTIVE IMPACT ANALYSIS IN A 5G TELCO NETWORK

(71) Applicant: VMWARE, INC., Palo Alto, CA (US)

(72) Inventors: Girish Nadger, Palo Alto, CA (US); Somenath Pal, Bangalore (IN); Somaresh Sahu, Bangalore (IN); Manohara Eshwarappa, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 206 days.

(21) Appl. No.: 17/007,052

(22) Filed: Aug. 31, 2020

(30) Foreign Application Priority Data

Jun. 16, 2020 (IN) .............................. 202041025282

(51) Int. Cl.
*G06F 11/00* (2006.01)
*G06F 11/07* (2006.01)
*H04L 41/12* (2022.01)
*H04L 41/22* (2022.01)
*H04L 41/0631* (2022.01)

(52) U.S. Cl.
CPC ........ *G06F 11/079* (2013.01); *G06F 11/0709* (2013.01); *G06F 11/0751* (2013.01); *G06F 11/0769* (2013.01); *H04L 41/065* (2013.01); *H04L 41/12* (2013.01); *H04L 41/22* (2013.01)

(58) Field of Classification Search
None
See application file for complete search history.

(56) References Cited

U.S. PATENT DOCUMENTS

| 9,736,046 B1* | 8/2017 | Jain ....................... H04L 41/065 |
| 10,693,711 B1* | 6/2020 | Garg ..................... G06F 11/079 |
| 2018/0091394 A1* | 3/2018 | Richards ............. H04L 12/4633 |
| 2019/0205153 A1* | 7/2019 | Niestemski ......... H04L 41/0681 |

OTHER PUBLICATIONS

Google Scholar/Patents search—text refined (Year: 2022).*

* cited by examiner

*Primary Examiner* — Christopher S McCarthy
(74) *Attorney, Agent, or Firm* — Clayton, McKay & Bailey, PC

(57) ABSTRACT

Examples herein describe systems and methods for impact assessment in a Telco network. An impact assessment engine can receive a scenario that species a symptom for a network resource. The scenario can be specified on an administrative console. The impact assessment engine can construct failure signatures in a codebook matrix. The codebook matrix correlates problems at impacted network resources to network symptoms. Based on the scenario, the impact assessment engine can generate synthetic failure signatures and isolate a subset based on which of the synthetic failure signatures are most common. Then, the system can identify tenants and services in the Telco network impacted by the subset. This can allow administrators or an automated process to identify potential impacts before a scenario occurs.

20 Claims, 11 Drawing Sheets

CODEBOOK

PROBLEMS (510)

| | R5:P1 | R5:P2 | R8:P3 | R8:P4 | R8:P5 | R9:P6 | R9:P7 | R9:P8 | R10:P9 | R10:P10 | R10:P11 | R11:P12 |
|---|---|---|---|---|---|---|---|---|---|---|---|---|
| R5:S1 | 1 | 1 | 1 | 0 | 1 | 1 | 1 | 0 | 1 | 0 | 1 | 1 |
| R5:S2 | 0 | 0 | 1 | 1 | 0 | 0 | 0 | 1 | 1 | 0 | 0 | 0 |
| R8:S3 | 1 | 1 | 0 | 0 | 1 | 0 | 0 | 0 | 0 | 0 | 0 | 1 |
| R8:S4 | 0 | 0 | 1 | 1 | 1 | 1 | 0 | 1 | 0 | 1 | 1 | 0 |
| R8:S5 | 1 | 0 | 0 | 0 | 0 | 0 | 0 | 0 | 1 | 0 | 0 | 0 |
| R8:S6 | 0 | 0 | 1 | 0 | 1 | 1 | 0 | 1 | 1 | 0 | 0 | 0 |
| R9:S7 | 0 | 1 | 1 | 0 | 0 | 0 | 1 | 0 | 0 | 1 | 0 | 0 |
| R9:S8 | 0 | 1 | 0 | 1 | 0 | 1 | 1 | 1 | 1 | 1 | 0 | 1 |
| R9:S9 | 1 | 0 | 1 | 1 | 1 | 1 | 1 | 0 | 1 | 0 | 1 | 0 |
| R10:S10 | 1 | 1 | 1 | 1 | 0 | 0 | 0 | 1 | 0 | 0 | 0 | 1 |
| R10:S11 | 1 | 0 | 1 | 0 | 0 | 0 | 0 | 1 | 1 | 0 | 1 | 0 |
| R11:S12 | 0 | 1 | 0 | 0 | 0 | 1 | 0 | 0 | 0 | 0 | 0 | 0 |
| R5:S13 | 0 | 0 | 1 | 0 | 0 | 0 | 1 | 0 | 0 | 1 | 1 | 1 |
| R5:S14 | 0 | 0 | 0 | 0 | 0 | 0 | 0 | 0 | 1 | 0 | 0 | 0 |
| R8:S15 | 0 | 0 | 0 | 0 | 0 | 0 | 0 | 0 | 0 | 0 | 0 | 0 |
| R8:S16 | 0 | 0 | 1 | 0 | 0 | 0 | 1 | 1 | 0 | 1 | 0 | 0 |
| R8:S17 | 0 | 0 | 0 | 0 | 0 | 1 | 0 | 1 | 0 | 0 | 1 | 1 |
| R9:S18 | 0 | 0 | 1 | 1 | 1 | 0 | 1 | 0 | 1 | 0 | 0 | 1 |
| R9:S19 | 1 | 1 | 1 | 1 | 1 | 1 | 1 | 1 | 0 | 1 | 1 | 1 |
| R10:S20 | 1 | 1 | 1 | 1 | 1 | 0 | 0 | 0 | 0 | 1 | 1 | 0 |
| R10:S21 | 1 | 0 | 1 | 1 | 1 | 0 | 1 | 1 | 1 | 0 | 1 | 1 |
| R10:S22 | 1 | 1 | 1 | 1 | 0 | 1 | 0 | 0 | 1 | 0 | 0 | 0 |
| R11:S23 | 1 | 1 | 1 | 1 | 1 | 0 | 1 | 1 | 0 | 1 | 1 | 1 |
| R11:S24 | 1 | 1 | 1 | 1 | 1 | 1 | 1 | 0 | 0 | 1 | 0 | 0 |

SYMPTOMS (520)

PROACTIVE IMPACT ANALYSIS IN A 5G TELCO NETWORK

RELATED APPLICATIONS

Benefit is claimed under 35 U.S.C. 119(a)-(d) to Foreign Application Serial No. 202041025282 filed in India entitled "PROACTIVE IMPACT ANALYSIS IN A 5G TELCO NETWORK", on Jun. 16, 2020, by VMware, Inc., which is herein incorporated in its entirety by reference for all purposes.

BACKGROUND

Enterprises of all types rely on networked clouds and datacenters to provide content to employees and customers alike. Telco networks are being expanded to enterprise use with the unveiling of 5G technology. The network can be segregated virtually, allowing many different tenants and users to share the underlying infrastructure. Tenants can be different enterprises with different use cases on the network. Network function virtualization ("NFV") relies on the physical and virtual layers and requires constant adaptation to meet data availability needs of the different tenants. Using NFV in the Telco cloud, network providers are able to quickly deliver new capabilities and configurations for various business and competitive advantages. This virtualization has led to more data availability than ever before, with even more promised based on widespread 5G technology adoption.

However, in a complex multi-tenant telco NFV environment, there can be a huge number of active failures based on degradations of the physical, virtual, and service layers of the network. Network administrators cannot easily assess the impact of these failures before they occur. Some failures are predictable in scenarios such as during maintenance, upgrades, movement of resources, replacement, and reconfigurations. The network provider needs to assess the impact that these failures will have. This can allow them to take preventative measures to avoid the impacts, such as moving virtual components to different hosts and other preventative measures.

Assessing impacts is particularly important in a dynamic multi-tenant environment, where a changing environment makes it difficult to understand which tenants and services will be impacted by a problem or change. Tenants often negotiate for particular network performance guarantees and those guarantees must be maintained across the dynamically changing infrastructure. A service level agreement ("SLA") can specify the performance minimums that the service provider needs to maintain for the tenant. Therefore, it is essential for a service provider to assess whether the impact of a particular problem will cause tenant performance to drop below the requirements of an SLA. Improved methods are needed to timely and accurately assess impacts in a dynamic, multi-tenant telco NFV deployment.

Currently, it is almost impossible to identify the cascading failures in a very complex and heterogeneous infrastructure. Because the virtual layer of the network is constantly changing and interconnected, it can be difficult to understand how a change to one part of a network can impact various tenants. In a multi-tenant Telco NFV deployment, conventional methods to assess the impact of a failure are hard to implement. They also usually do not guarantee the assessment of SLAs and business contracts to the tenants, which results in revenue losses to Telco-NFV service providers.

As a result, a need exists for proactive impact analysis in a 5G Telco network.

SUMMARY

Examples described herein include systems and methods for prioritizing problems in a Telco network. In one example, an impact assessment engine can receive a scenario that includes a symptom at a network resource. The scenario can be selected by an administrator using a console GUI or can be generated from an orchestrator process based on potential upcoming network actions. The symptom can be a deterministic state, such as power state and network connectivity, or it can be non-deterministic, such as CPU usage or memory consumption. Symptoms can be identified in alerts from network resources, in an example. The selected scenario can identify at least one symptom at a network resource.

Using the scenario, the impact assessment engine can predict the most likely problems to occur. These problems can identify an impacted network resource and tenant. This can allow an administrator or an automated process to know how an action may impact tenants and resources in a complex and dynamic network. The administrator or orchestrator process may need to know which problems and tenants can be impacted in order to make preventative decisions and minimize negative impact to important customers. For the purposes of this disclosure, the administrator can be a user or, alternatively, can be an automated process or service.

The impact assessment engine can maintain a codebook matrix based on problems and symptoms in the network. The codebook matrix can be one or more tables or vectors, in an example. The codebook matrix can be built based on root cause analysis ("RCA") information from an analytics engine that correlates a problem between multiple network resources, in an example. These resources can span virtual, physical, and service layers of the network. For example, a problem at a physical hardware device, such as a server, can impact a virtual entity, such as a VNF, that runs on that hardware device. Similarly, a service that relies on the VNF can also be affected. The analytics engine can generate problem notifications that indicate the impacted resources, such as based on which symptoms led to the problem in the first place. The problem notification can identify a root-cause problem and impacted network resources for an observed set of symptoms.

The impact assessment engine can construct failure signatures as part of the codebook matrix. The failure signature can correlate symptoms to a problem. This can be done using a table, such that a row or column corresponds to a problem and the individual values in the row or column represent symptoms. For example, each symptom that is known to be part of a problem can be identified in the failure signature for that problem. The failure signature can also indicate lack of particular symptoms, in an example. Failure signatures can also be implemented using vectors, in an example.

The impact assessment engine can generate synthetic failure signatures by applying the scenario to the codebook matrix. For example, the scenario can indicate one or more symptoms. Using the symptoms of the scenario as a given, the assessment engine can identify the failure signature with those symptoms and treat the identified failure signatures as the synthetic failure signatures. In other words, those failure signatures can be synthetic since they are based on one or more hypothetical symptoms of the scenario. The impact assessment engine can identify the synthetic failure signatures based on the scenario and combine the synthetic failure signatures in a correlation matrix, in an example. The correlation matrix can be smaller than the codebook matrix and more efficient for using in determining the most likely problems associated with the scenario.

Next, the impact assessment engine can isolate a subset of the synthetic failure signatures based on which of the failure signatures are most probable. This can include determining occurrence frequency of the problems based on received alerts over a time period. For problems that have the same or similar frequency of occurrence over a time interval, the problems can be ranked based on how often their corresponding symptoms appear in the correlation matrix. For example, the count of symptom occurrences can be summed for all symptoms of the problems. The impact assessment engine can rank the problems by summing the symptom rankings, in an example. The ranking can determine which synthetic failure signatures meet the ranking threshold for an isolated subset used to identify impacts to an administrator or automated process.

The impact assessment engine can then identify tenants and services in the Telco network that are likely to be impacted based on the scenario. This can include displaying the network resources associated with the highest-ranked problems. Additionally, a separate table that correlates tenants to network resources can be used to identify the impacted tenants. Specific services that utilize the impacted network resources can also be identified in an example.

In one example, the impact assessment engine can list the problems, network resources, and tenants implicated by the scenario on a graphical user interface ("GUI"). This can allow an administrative user or administrative process to know how a scenario most likely will impact network resources and tenants. In one example, the administrator can select the maximum number of problems to identify, so that only the potential impacts from problems ranked above that maximum are displayed.

The method can be performed as part of a system that includes one or more physical servers having physical processors. The processors can execute instructions to perform the method. In one example, the instructions are read from a non-transitory, computer-readable medium.

Both the foregoing general description and the following detailed description are exemplary and explanatory only and are not restrictive of the examples, as claimed.

BRIEF DESCRIPTION OF THE DRAWINGS

FIG. 5A is an example illustration of a codebook matrix.

FIG. 5B is an example illustration of a codebook matrix.

DESCRIPTION OF THE EXAMPLES

Figure 1:
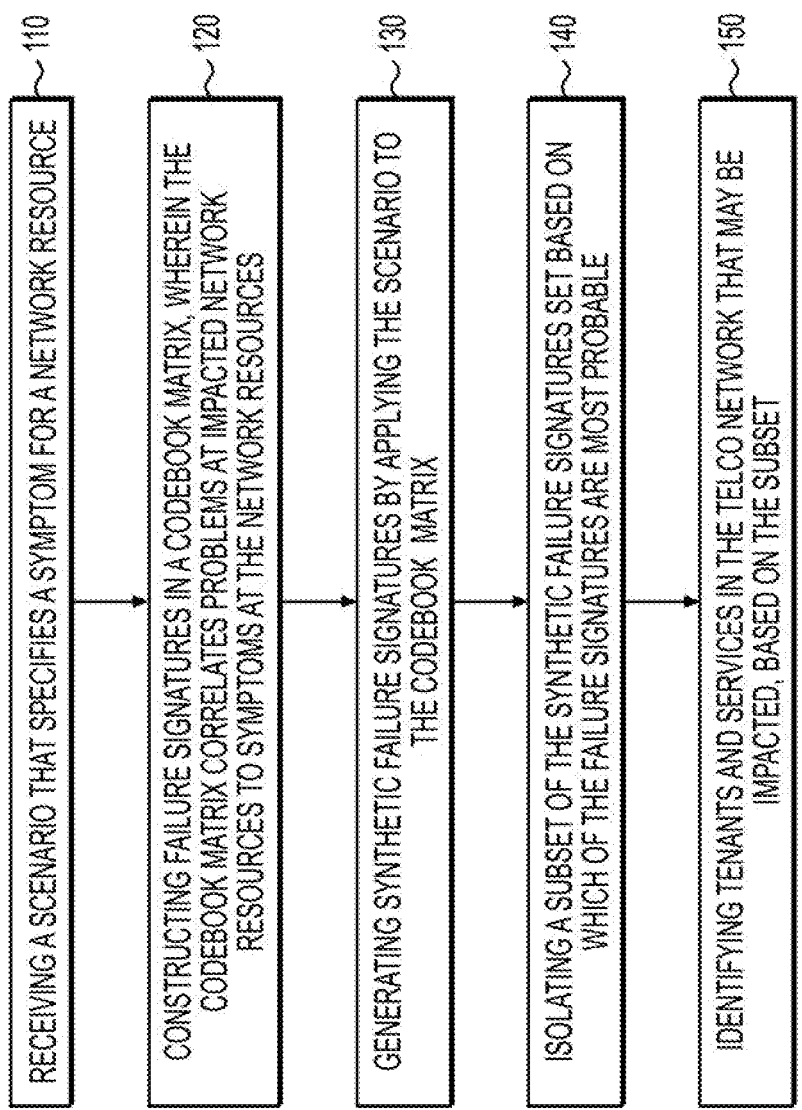
FIG. 1 is a flowchart of an example method for impact prediction in a Telco cloud.

Reference will now be made in detail to the present examples, including examples illustrated in the accompanying drawings. Wherever possible, the same reference numbers will be used throughout the drawings to refer to the same or like parts.

In one example, an impact assessment engine can predict problems in a Telco network based on a selected scenario. The problem prediction can indicate a network resource and tenant likely to be impacted based on the scenario. The scenario can be selected by an administrator on a GUI. The administrator might also wish to see predictable problems that can arise based on an anticipated scenario in the network. Example scenarios can include performing maintenance or upgrades at a server, using high bandwidth at a node during a sporting event, moving a resource, replacing hardware, or reconfiguring a network resource.

Network resources can be part of the physical, virtual, or service layers of the network. For example, virtual components can include virtual controllers, virtual routers, virtual interfaces, virtual local area networks ("VLANs"), host virtual machines ("VMs"), or other virtualized network functions. They can rely on one or more virtual entities, such as VMs, hypervisors, apps, or guest operating systems. Physical components can include physical devices, such as controllers, routers, switches, or servers. Physical components can be parts of those physical devices, such as interfaces, memory, processors, and the like.

The impact assessment engine can receive a codebook matrix used to correlate problems to symptoms. The symptoms can include events at different network resources. The codebook matrix can be based on a topology that is constructed by an analytics engine. The topology can describe how physical, virtual, and service components relate to one another. The topology can be a graph, in an example. The analytics engine can supply the codebook matrix in one example. Alternatively, the codebook matrix can be constructed based on machine learning that correlates problems to symptoms that occur in other network components. In one example, RCA is sent from the analytics engine to the impact assessment engine.

The impact assessment engine can identify problem signatures in the codebook matrix that include the symptom(s) of the scenario. To do this, synthetic problem signatures that include the scenario can be identified within the codebook matrix. Those synthetic problem signatures can form a correlation matrix that is reduced in size and easier for a processor to work with. Then the symptoms and problems can be scored to isolate the most likely or important problems for an administrator to be aware of. Those problems, including the impacted network resource and tenant, can be displayed on a GUI. Different tenants can have different SLAs with the Telco provider regarding guaranteed performance minimums, so the administrator or an automated process can take those into account prior to enacting the scenario, in an example.

FIG. 1 is an example flowchart of steps performed by a system for proactive impact analysis in a Telco NFV cloud. The Telco cloud can be a type of distributed network, in which network functions are located at different geographic locations. These locations can be different clouds, such as an edge cloud near a user device and core clouds where various analytics engines can execute.

At stage 110, the impact assessment engine can receive a scenario. The scenario can be selected on an administrative console by an administrator, in an example. For example, the administrator may wish to determine potential impacts of an action before taking the action on a network resource. The administrative console can include a GUI that provides the administrator with tools for constructing a scenario. For example, the administrator can select a network resource, such as a server, and then select an action or condition, such as an upgrade or restart. This can generate a scenario that specifies a symptom for the network resource. For example, the symptom can be "power cycling" and the network resource can be the server. The network component can be any physical device, virtual component, or service in the Telco network, in an example. The symptom can be any state that can occur at that network component. An example of a component with multiple symptoms is a VM that has several deterministic symptoms (such as its power state, network connectivity, VNIC state) and several non-deterministic symptoms (such CPU usage or memory consumption).

The impact assessment engine can run as part of an orchestrator process in one example. The orchestrator can assess the likely impacts of a scenario prior to performing the scenario. For example, if the orchestrator needs to restart a VNF or power down a failing physical device, the orchestration process can first identify likely impacts to existing tenants and services. This can allow the orchestrator to notify an administrator if important tenants or services may be impacted. Alternatively, the orchestrator can perform corrective actions on the virtual or physical components based on the predicted impact by the scenario. For example, a VNF that is key to a tenant's service can be moved onto a different host before the scenario of powering down the existing host.

At stage 120, a codebook matrix having failure signatures can be constructed by an analytics engine or the impact assessment engine. This stage can be ongoing in an example. For example, an analytics engine can receive information from physical and virtual portions of the network and perform RCA. To facilitate the RCA, a codebook matrix can correlate problems to various symptoms in the network. The symptoms can be states or alerts of other network components. The symptoms can also include thresholds with respect to key performance indicators ("KPIs") of a network component. To correlate these symptoms to a problem, a machine learning process can review past telemetry and relationships between network components based on a topology graph.

The codebook matrix can be a table that includes a first dimension for problems at network resources. A second dimension can represent symptoms corresponding to those problems, in an example. In a table format, the problem can be a column with rows corresponding to symptoms. A value can represent whether or not a symptom exists for that problem. The failure signatures can be, for example, columns in the codebook matrix. For example, for a given problem, the failure signature can be those symptoms which tend to contribute to the problem.

An example codebook matrix is discussed later with respect to FIGS. 5A and 5B. However, the codebook matrix can also be implemented in other non-table forms. For example, the codebook matrix can be a graph of nodes and edges. A root node can represent a problem at a resource. Additional nodes can be the symptoms linked to that problem by edges. In still another example, the codebook matrix can be a set of vectors. Each vector can represent a problem, and the individual cells of the vector can represent symptoms.

To construct the codebook matrix, the analytics engine or impact assessment engine can correlate problems to symptoms. To do this, the engine can combine alerts from the virtual layer, physical layer, and service layers. A problem can correspond to symptoms that arise in one or more of those layers. For example, symptoms can be identified based on spatial analysis that links events at the virtual component and the physical component. To link information from different network layers, the analytics engine can use a topology of mapping services. These can associate the virtual components to hardware components on which they run. Similarly, services can be tied to virtual components that they utilize. In one example, this mapping is accomplished by maintaining a graph database in which the nodes (objects) represent virtual and physical components. Edges between the nodes can represent relationships. In this way, a graph database can, for example, link VNFs to particular hardware. The graph database can allow the analytics engine to more accurately correlate the KPIs and fault information and issue problem notifications with the correct symptomology. The topology represented by the graph database can continually and dynamically evolve based on a data collector framework and discovery process that creates the topology based on what is running in the Telco cloud. The discovery process can account for both physical and virtual components. Network resources can be mapped together and identified in symptomology for a problem. An example topology is discussed later with respect to FIG. 4.

Continuing with FIG. 1, at stage 130 the impact assessment engine can generate synthetic failure signatures by applying the scenario to the codebook matrix. The scenario can comprise one or more symptoms. For example, a scenario can include a first symptom, which is treated as present even if it is not currently taking place in the network. The impact assessment engine can apply the scenario to the codebook matrix by determining which columns in the codebook matrix include the first symptom. The identified columns can be synthetic failure signatures. The synthetic failure signatures can be generated by distinguishing them from other columns in the codebook matrix. For example, the synthetic signatures can be collected in another matrix, called a correlation matrix. The correlation matrix can be smaller than the codebook matrix, allowing for faster additional analysis by a processor running the impact assessment engine. The signatures are called "synthetic" because the scenario itself need not be taking place currently.

At stage 140, the impact assessment engine can isolate a subset of the synthetic failure signatures. This can allow an administrator or orchestration process to focus on the most relevant subset of synthetic failure signatures rather than a larger and potentially unwieldy number. A Telco network can be very complex with many interconnected network resources. As a result, the impact assessment engine can sometimes generate a large number of synthetic signatures at stage 130, depending on the scenario. Stage 140 can effectively reduce the set to something more manageable.

The subset can be determined based on which problems occur most frequently within a time period, such as a day or an hour. The occurrence of the problems can be counted based on alerts received from the analytics engine, in an example.

However, further ranking can be performed for problems with the same or close to the same frequency of occurrence. In that case, the impact assessment engine can break the tie by determining which of the problems have the highest occurrence of symptoms. The ranking can be based on the number of times the symptoms appear in the codebook matrix or, in another example, in the correlation matrix. The symptoms can be assigned number values based on their rankings. For example, higher ranking symptoms can correlate to higher number values. These are also referred to as "symptom values." For each synthetic problem signature, the impact assessment engine can sum the symptom values. The synthetic problem signatures can then be ranked based on the highest total sums.

The number of synthetic problem signatures for the subset can be based on administrator input. For example, on the administration console GUI, the administrator can select a maximum number of impact predictions to generate. This can speed up processing and allow the administrator to then focus on a limited and more likely number of impacted resources and tenants, in an example. The maximum number can act as a ranking threshold against the ranked synthetic problem signatures. Those with a high enough ranking can be kept as the isolated subset of synthetic problem signatures.

At stage 150, the impact assessment engine can identify potentially impacted tenants and services in the Telco network. To do this, the impact assessment engine can identify the network resource for a respective synthetic problem signature of the subset. The network resource can be used by one or more tenants and services. The impact assessment engine can identify those tenants based on one or more tables or the network topology graph. The impact assessment engine can do the same for services.

The impact assessment engine can display the potentially impacted tenants and services on a GUI, such as an administrative console. This can allow for an administrator to do preventative remediation, in an example, prior to making the scenario a reality. Alternatively, the services and tenants can be identified to an automated remediation process. For example, when a change is being made to the network, the impacted services and tenants can first be identified. An automated remediation process can attempt to make its own remedial changes based on the tenant or service prior to the network change (e.g., scenario) taking place.

Figure 2:
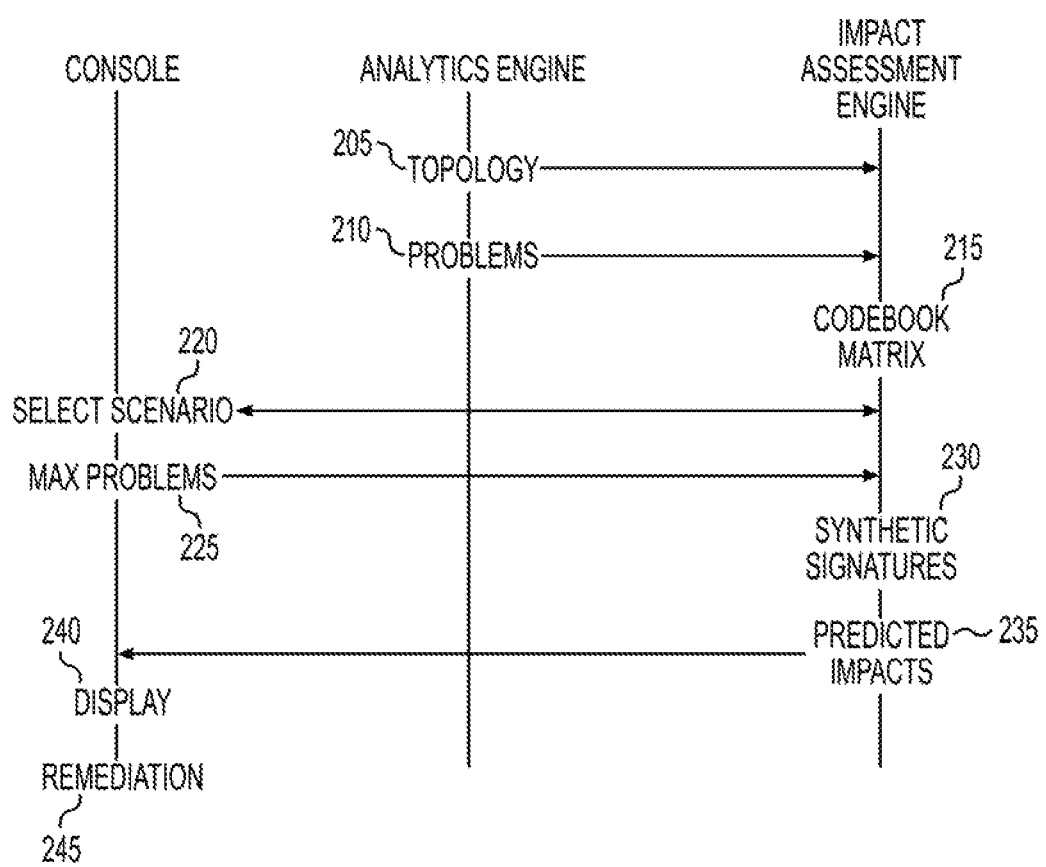
FIG. 2 is a sequence diagram of example steps for impact prediction in a Telco cloud.

FIG. 2 is an example sequence diagram for predicting potential impacts of a scenario in a Telco network. At stage 205, an analytics engine can send a network topology to the impact assessment engine. The topology can be a graph containing linked network resources, in one example. The network resources can span different layers of the network, such as the physical layer, virtual layer, and service layer. The network topology can track relationships between network resources. The topology can include a graph of network resources, such as available switches, VNFs, and processes that use both. The topology can also include data underlying the graph of network resources that can be used to reconstruct the graph. For example, the hardware in the VSN can report which VNFs are running on which devices and which switches are in communication with one another. By discovering both the hardware and virtual components, the system can map these together to create the topology. This can be created by the analytics engine itself, which can include one or more processes. Alternatively, an outside process can create the topology and send it to the analytics engine.

The analytics engine can identify problems based on symptoms, in one example. The problems can be sent to the impact assessment engine at stage 210. The problems can include the symptoms, in one example. For example, the analytics engine can perform RCA and link problems to underlying symptoms that can occur at other network resources. As part of performing RCA, the analytics engine can match symptoms to a model. The right combination of symptoms can lead the analytics engine to generate a problem notification. The problem notification can identify the network resource where the problem occurs and the impacted resources. The problem notification can also indicate which symptoms are present at which impacted resources, in an example. The problem notification can be sent to an impact assessment engine, which can be part of an orchestrator process in an example.

At stage 215, the impact assessment engine can generate a codebook matrix. The codebook matrix can include problem signatures. The problem signatures can link a problem to underlying symptoms, in an example. These can be assembled based on the problems received from the analytics engine in an example. Alternatively, the analytics engine can build the codebook matrix and send it to the impact assessment engine. The codebook matrix can be stored in any non-transitory, computer-readable storage medium that is accessible to the impact assessment engine.

At stage 220, an administrator can select a scenario to see potential impacts to tenants and services. The selection can be made on a GUI, such as on an administrative console. In one example, the choices for selection are tied to actions that the administrator can perform on network resources. Alternatively, the symptoms of the codebook matrix can be selectable as scenarios, in an example. The selected scenario can include one or more symptoms. The selected scenario can be sent to the impact assessment engine for determining the potential corresponding impacts.

The administrator can also select a maximum number of impacts to display at stage 225. This can limit the number of synthetic failure signatures ultimately used for displaying impacted tenants and services. The maximum number can be sent to the impact assessment engine for use in the impact analysis.

At stage 230, the impact assessment engine can determine which synthetic signatures correspond to the scenario. This can include identifying columns of the codebook matrix that include the symptom(s) identified as the scenario. The impact assessment engine can generate synthetic failure signatures, such as in the form of a correlation matrix, such as in Table 1, below.

TABLE 1

|    | P1 | P2 | P3 | P4 |
|----|----|----|----|----|
| S1 | 0  | 0  | 1  | 0  |
| S2 | 1  | 0  | 0  | 0  |
| S3 | 0  | 1  | 0  | 1  |
| S4 | 1  | 1  | 1  | 1  |
| S5 | 0  | 0  | 1  | 0  |

In Table 1, four synthetic failure signatures (P1-P4) are generated based on a scenario that includes symptom S4. The symptoms can then be ranked based on the total number of problems in which they appear. This total can be based on the correlation matrix (e.g., Table 1) or the larger codebook matrix, in an example.

To rank the symptoms, the impact assessment engine can user Equation 1, below, where n represents the total number of synthetic failure signatures.

$$\text{Rank}(S_k) = \sum_{i=1}^{n} X_{k,i} \qquad \text{Equation 1}$$

Applied to the current example, the impact assessment engine can determine ranks of the symptoms as shown in Table 2.

TABLE 2

$\text{Rank}(S_1) = X_{1,1} + X_{1,2} + X_{1,3} + X_{1,4} = 0 + 0 + 1 + 0 = 1$
$\text{Rank}(S_2) = X_{2,1} + X_{2,2} + X_{2,3} + X_{2,4} = 1 + 0 + 0 + 0 = 1$
$\text{Rank}(S_3) = X_{3,1} + X_{3,2} + X_{3,3} + X_{3,4} = 0 + 1 + 0 + 1 = 2$
$\text{Rank}(S_4) = X_{4,1} + X_{4,2} + X_{4,3} + X_{4,4} = 1 + 1 + 1 + 1 = 4$
$\text{Rank}(S_5) = X_{5,1} + X_{5,2} + X_{5,3} + X_{5,4} = 0 + 0 + 1 + 0 = 1$ The impact assessment engine can use the symptom rankings to rank the synthetic failure signatures for sorting. This can allow the impact assessment engine to present the most relevant synthetic failure signatures first and limit the overall number reported. In one example, the impact assessment engine can rank the failure signatures according to Equation 2, below, where m represents the total number of symptoms.

$$\text{Rank}(P_h) = \sum_{i=1}^{m} Rs^{(i)} * X_{i,h} \qquad \text{Equation 2}$$

Applied to the current example, the impact assessment engine can determine ranks of the synthetic signatures as shown in Table 3.

TABLE 3

$\text{Rank}(P_1) = Rs^{(1)} * X_{1,1} + Rs^{(2)} * X_{2,1} + Rs^{(3)} * X_{3,1} + Rs^{(4)} * X_{4,1} + Rs^{(5)} * X_{5,1} = 1 * 0 + 1 * 1 + 2 * 0 + 4 * 1 + 1 * 0 = 5$
$\text{Rank}(P_2) = Rs^{(1)} * X_{1,2} + Rs^{(2)} * X_{2,2} + Rs^{(3)} * X_{3,2} + Rs^{(4)} * X_{4,2} + Rs^{(5)} * X_{5,2} = 1 * 0 + 1 * 0 + 2 * 1 + 4 * 1 + 1 * 0 = 6$
$\text{Rank}(P_3) = Rs^{(1)} * X_{1,3} + Rs^{(2)} * X_{2,3} + Rs^{(3)} * X_{3,3} + Rs^{(4)} * X_{4,3} + Rs^{(5)} * X_{5,3} = 1 * 0 + 1 * 0 + 2 * 0 + 4 * 1 + 1 * 1 = 5$
$\text{Rank}(P_4) = Rs^{(1)} * X_{1,4} + Rs^{(2)} * X_{2,4} + Rs^{(3)} * X_{3,4} + Rs^{(4)} * X_{4,4} + Rs^{(5)} * X_{5,4} = 1 * 0 + 1 * 0 + 2 * 1 + 4 * 1 + 1 * 0 = 6$ In this example, the synthetic failure signatures can be ranked as $P_4$, $P_2$, $P_1$, $P_3$. If the maximum number to report is two, then the impact assessment engine can isolate synthetic signatures $P_4$ and $P_2$. These can be used to predict impacts at stage 235.

At stage 235, the impact assessment engine can identify tenants and services related to $P_4$ and $P_2$. To do this, the impact assessment engine can traverse the topology graph of network components. The graph can link tenants and services to the resources of the isolated synthetic signatures, $P_4$ and $P_2$. This will be discussed in more detail with respect to FIG. 4.

Continuing with FIG. 2, the impacted tenants and services can be sent to an administrative console for display at stage 240 in one example. In one example, the GUI shows which tenants and services will likely suffer problems based on the scenario. This can allow the administrator to perform remedial actions at stage 245 prior to enacting the scenario. The administrator can mark the potential impacts as addressed in the GUI, in one example, prior to the GUI allowing the administrator to perform the scenario.

Alternatively, the impact assessment engine can send the impacted tenants and services to an orchestration process for use in preventative remediation at stage 245. The orchestrator can attempt to automatically remediate potential issues before allowing the scenario to take place.

Figure 3:
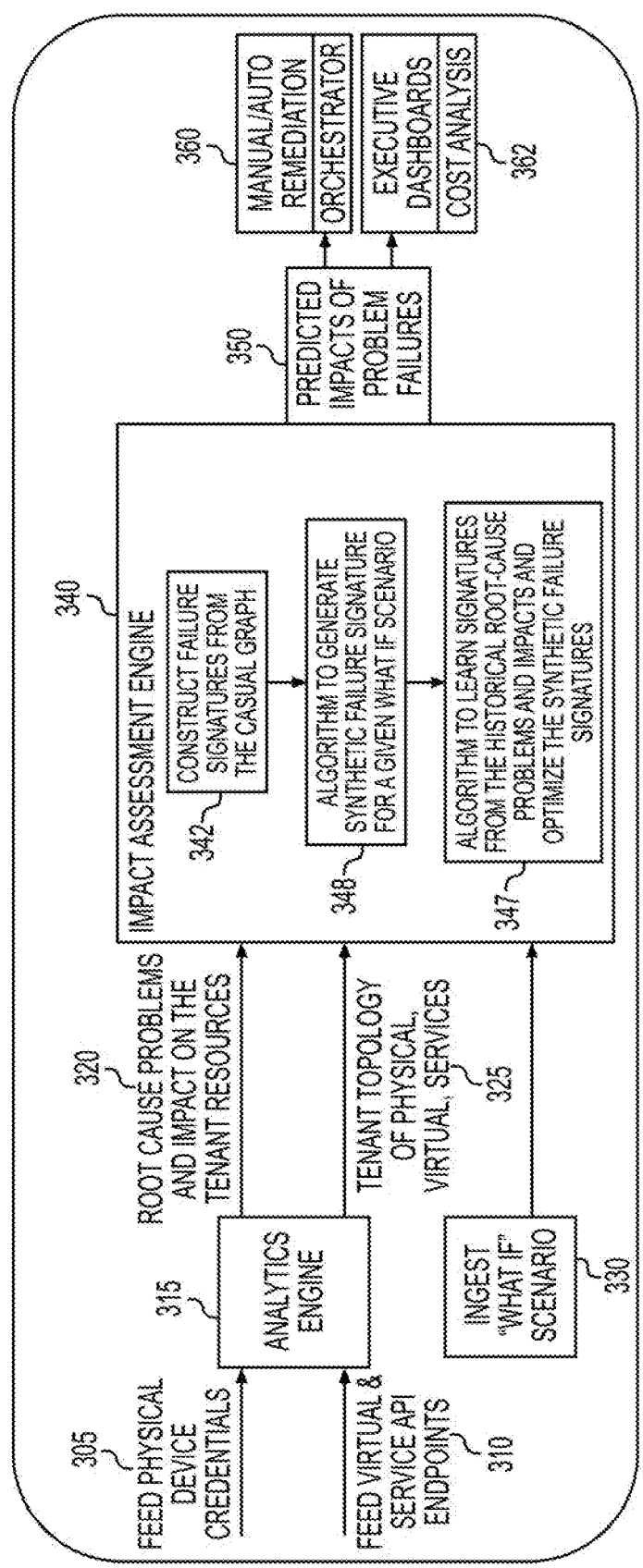
FIG. 3 is an example system diagram including components for self-aware service assurance in a Telco network.

FIG. 3 is an example diagram of system components and related stages for predicting impacts based on a scenario in a Telco network. An analytics engine 315 can receive physical device credentials at stage 305 and virtual and service endpoints at stage 310. The physical device credentials can identify devices and their locations in the network. For example, an internet protocol (IP) address for the device can be included. The virtual and service endpoints can identify network resources in the virtual and service layers of the network. These layers can run on top of the physical layer, which is made up of the physical devices. The physical, virtual, and service resources can report operational characteristics, such as through use of an API. This can allow the analytics engine to receive KPIs, alarms, and operational states. From that information, the analytics engine can detect problems based on RCA. This can include identifying symptoms of problems, which can impact other network resources in addition to the network resource where the root-cause problem exists.

At stage 320, the analytics engine 315 can send a problem notification to the impact assessment engine 340. The problem notification can identify the network resource with the root-cause problem and the other symptomatic resources (e.g., symptom and resource pairings). The symptoms can be codes that can be matched against particular tenants in combination with the network resource, in an example.

The analytics engine 315 can also provide the topology of network resources to the impact assessment engine 340 at stage 325, in an example. In one example, this can include only providing the topology that is relevant for the problems sent over at stage 320, or for a certain tenant. For example, if a root cause problem is at a first network resource, then the topology of vertices connecting to the first network resource can be provided at stage 325. The provided topology can be multiple connection levels deep. Similarly, if a batch of fifteen problems are provided at stage 320, then the topology of vertices that connect back to any of those fifteen problems can be provided.

The impact assessment engine 340 can be one or more processes that run on the network. In one example, the impact assessment engine 340 runs as a module of the analytics engine 315. Alternatively, it can run as part of an orchestrator suite or process.

The impact assessment engine 340 can construct failure signatures at stage 342 by creating a codebook matrix that represents problems and associated symptoms. A machine learning algorithm can recognize over time that certain combinations of network resources and states cause impacts throughout the network. The failure signatures can be based on recognition of these patterns, in an example.

The impact assessment engine 340 can receive a scenario at stage 330. The scenario can identify at least one network resource and symptom, in an example. Using the scenario and codebook matrix, the impact assessment engine 340 can generate synthetic failure signatures at stage 348. For example, the impact assessment engine 340 can identify synthetic failure signatures within the codebook matrix that include the symptom specified as part of the scenario. The impact assessment engine 340 can execute algorithms to rank and isolate the synthetic failure signatures. The isolated synthetic failure signatures can be used to identify impacts to tenants and services for the scenario. For example, for each remaining failure signature, the impact assessment engine 340 can locate the problematic network resource within the topology. For that resource, the impact assessment engine 340 can determine which tenants and services use the resource.

Additionally, a machine learning algorithm 347 can continuously or periodically update the failure signatures of the codebook matrix based on additional RCA and problems received at stage 320. This can allow the predictions to become more accurate over time.

At stage 350, the impact assessment engine 340 can send the predicted impacted tenants and services to a remediation platform 360, such as an orchestrator. The remediation platform 360 can include a GUI that allows an administrator to review the potential impacts, which can be displayed as alerts for the selected scenario. In one example, remediation is automatic. Certain problems can be addressed programmatically. For example, a new VM can be instantiated or a service can be restarted. Other problems can be manually handled by an administrator.

At stage 350, the impact assessment engine 340 can send a cost-based impact list to an executive dashboard 362. This can allow executives to perform cost analysis for a scenario, which can allow for deciding how to add or decrease network infrastructure. In one example, the tenants are weighted based on overall revenue and the services are weighted based on importance to the respective tenant. Services can also be flagged based on importance to SLA requirements. The results can be used to prioritize the potential impacts based on cost.

Figure 4:
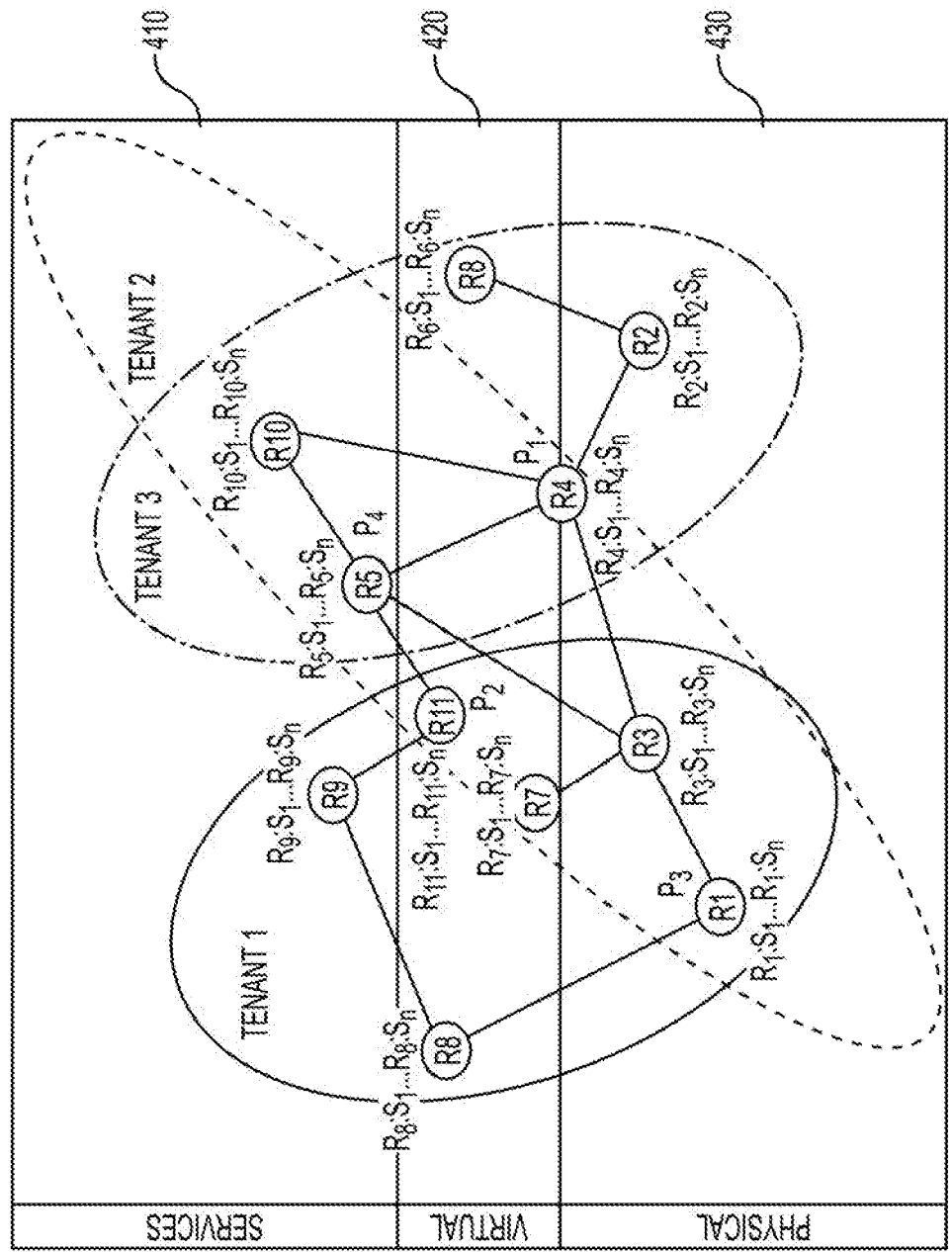
FIG. 4 is an example graph of relationships between network resources.

FIG. 4 is an example illustration of a network topology that can be used in determining failure signatures and identifying which tenants and services are impacted when a problem arises at a resource. The network can be segregated into layers, such as a physical layer 430, virtual layer 420, and services layer 410. In turn, the network resources can correspond to the layers 410, 420, 430. For example, a physical device and physical entity can be a resource type from the physical layer 430. The virtual layer 420 can include virtual devices, virtual entities, and virtual degradation. The services layer 410 can include services and service degradation.

In this example, the topology can map tenants to network resources (R) and symptoms (S). For example, Tenant 1 can include R1, R3, R7, R8, R9, and R11. These are network resources spanning the physical layer 430 (R1 and R3), virtual layer 420 (R7, R8, and R11), and the services layer (R9). Additionally, the resources R can be assigned to specific symptoms S. This can allow for segregating the topology according to tenant based on which symptoms S at particular resources R are relevant to which tenant, in an example. Continuing with FIG. 4, Tenant 2 can include R1, R3, R4, R5, R7, R10, and R11. Again, this can be with regard to specific symptoms for each resource R, in an example. Tenant 3 can utilize R2, R4, R5, R8, and R10.

The topology can be a graph where the resources are nodes. In one example, the nodes can identify the symptoms that are possible at the node. A resource can be identified for a problem. Symptoms of the problem can arise at linked resources. The symptoms of the problem therefore can be in the form of a resource/symptom pair (R:S), in an example. The impact assessment engine 340 can receive a scenario that includes at least one R:S pair, in an example. This can allow the impact assessment engine 340 to determine potential impacts for a scenario. The resource nodes can be correlated to problems ($P_x$) and tenants.

When a problem, such as $P_4$, is identified as a synthetic failure signature, the impact assessment engine can use the topology to determine impacted tenants and resources. In the example of FIG. 4, the topology shows a first problem $P_1$ occurring at R4, as second problem $P_2$ at R11, a third problem $P_3$ at R1, and a fourth problem $P_4$ at R5. When $P_4$ is identified as a synthetic failure signature, the impact assessment engine 340 can also identify R5 as impacted. In this example, the topology links R5 to a service utilized by Tenants 2 and 3. In this way, some network resources and symptoms can apply to multiple tenants at once.

Figure 5B:
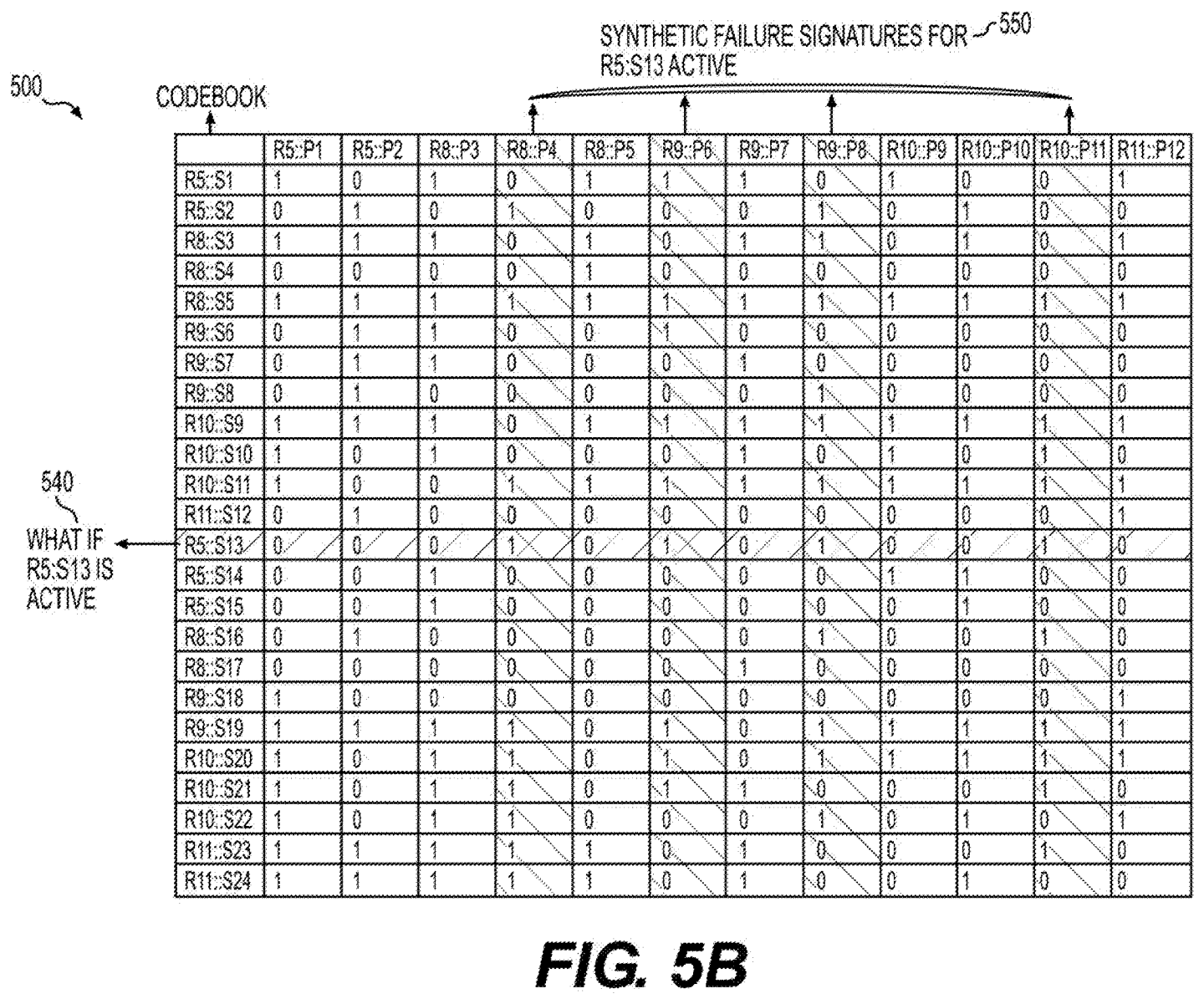

FIGS. 5A and 5B show an example codebook matrix 500 in the form of a table. In FIG. 5A, problems 510 are presented as columns and symptoms 520 are presented as rows. Individual cells can contain a "1" to indicate the symptom is active. A zero value can indicate that the symptom is not part of the problem or that the symptom is not active. In this way, the codebook matrix 500 can map problems to symptoms. A set of symptoms per column can be referred to as a failure signature. When the active symptoms align with the column values, the problem identified by the column can be considered active.

Turning to FIG. 5B, a "what-if" scenario 540 can be used to determine synthetic failure signatures. Based on the scenario 540, the system can predict which problems are likely to occur. In this example, the scenario 540 is the symptom R5:S13, meaning that system should assume symptom S13 exists at network resource R5 for this scenario 540. This scenario 540 can be selected by an administrator using a GUI, in one example. The GUI can display information that translates the R5 into something meaningful, such as voice-over-IP ("VOIP") service.

To simulate the impact of scenario 540, the impact assessment engine 340 can identify the set of failure signatures that can turn active when the scenario 540 occurs. In this example, the set of generated synthetic failure signatures 550 is shown as shaded columns in FIG. 5B. In all four of the generated synthetic failure signatures 550, the symptom R5:S13 is active. These represent the columns where the R5:13 row indicates an active symptom. In this example, the generated synthetic failure signatures are therefore represented in Table 4, below.

TABLE 4

Signature 1: {R5:S2, R8:S5, R10:S11, R9:S19, R10:S20, R10:S21, R10:S22, R11:S23, R11:S24}
Signature 2: {R5:S1, R8:S5, R9:S6, R10:S9, R10:S11, R9:S19, R10:S20, R10:S21}
Signature 3: {R5:S2, R8:S3, R8:S5, R9:S8, R10:S9, R10:S11, R8:S16, R9:S19, R10:S20, R10:S22}
Signature 4: {R8:S5, R10:S9, R10:S10, R10:S11, R8:S16, R9:S19, R10:S20, R10:S21, R11:S23}

Generating these synthetic failure signatures 550 can include generating a correlation matrix. The correlation matrix can include the synthetic failure signatures 550 in an example, while omitting signatures that do not include the scenario 540. A correlation matrix can be used to decrease computation resources needed in further isolating the most relevant of the synthetic failure signatures 550. Although the example of FIGS. 5A and 5B only includes four such signatures, a real customer deployment with a very complex network topology could yield a large number of synthetic failure signatures 550 for the scenario 540. Methods to generate the correlation matrix and isolate the most relevant synthetic failure signatures are discussed with respect to FIGS. 6A and 6B.

Figure 6A:
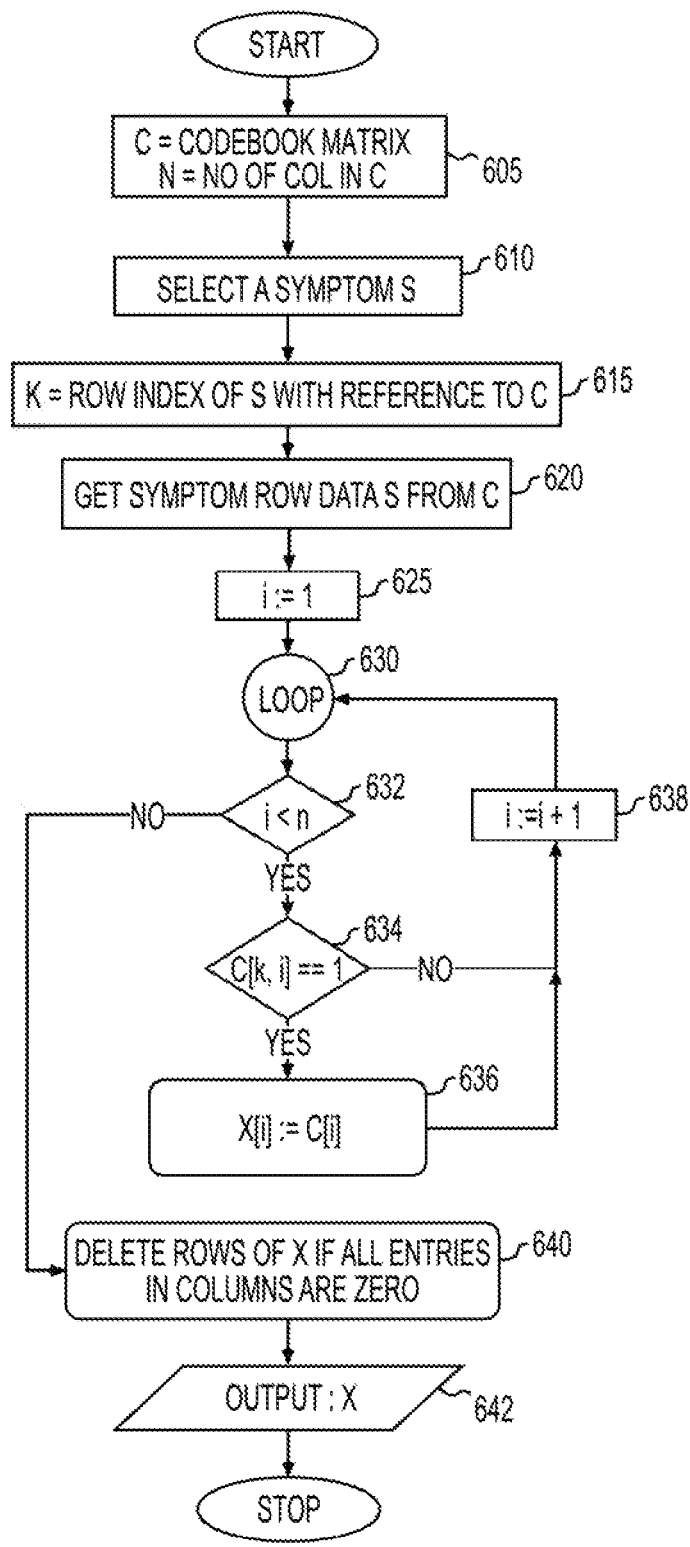
FIG. 6A is a flowchart of an example method for determining a correlation matrix.

Turning to FIG. 6A, an example method for generating the correlation matrix is illustrated. At stage 605, a pointer C to the codebook matrix 500 can be established and the number of columns can be stored in a variable N. At stage 610, an administrator or automated process can select symptom S as part of selecting a scenario. The impact assessment engine 340 can access the correlation matrix 500 using the symptom as a row index at stage 615. The row data can be retrieved at stage 620.

The impact assessment engine 340 can then define an index at stage 625 and begin looping through the row data at stage 630. If the index is less than or equal to the number of cells in the row at stage 632 (i.e., less than the number of columns n), then the impact assessment engine 340 can check whether the cell has a value (e.g., 1) representing an active symptom at stage 634. If so, then at stage 636 the impact assessment engine 340 can adjoin the column of the codebook matrix C to the correlation matrix X. If not, then the column is not adjoined in an example. The impact assessment engine 340 can increase the index at stage 638 and continue the loop at stage 630.

At stage 640, the impact assessment engine 340 can further reduce the size of the correlation matrix by deleting rows where all entries are zero. This can shrink one dimension of the correlation matrix without losing symptom data that influences isolation of the most relevant synthetic failure signatures, in an example. At stage 642, the completed correlation matrix X can be used for further isolation of the synthetic failure signatures.

Figure 6B:
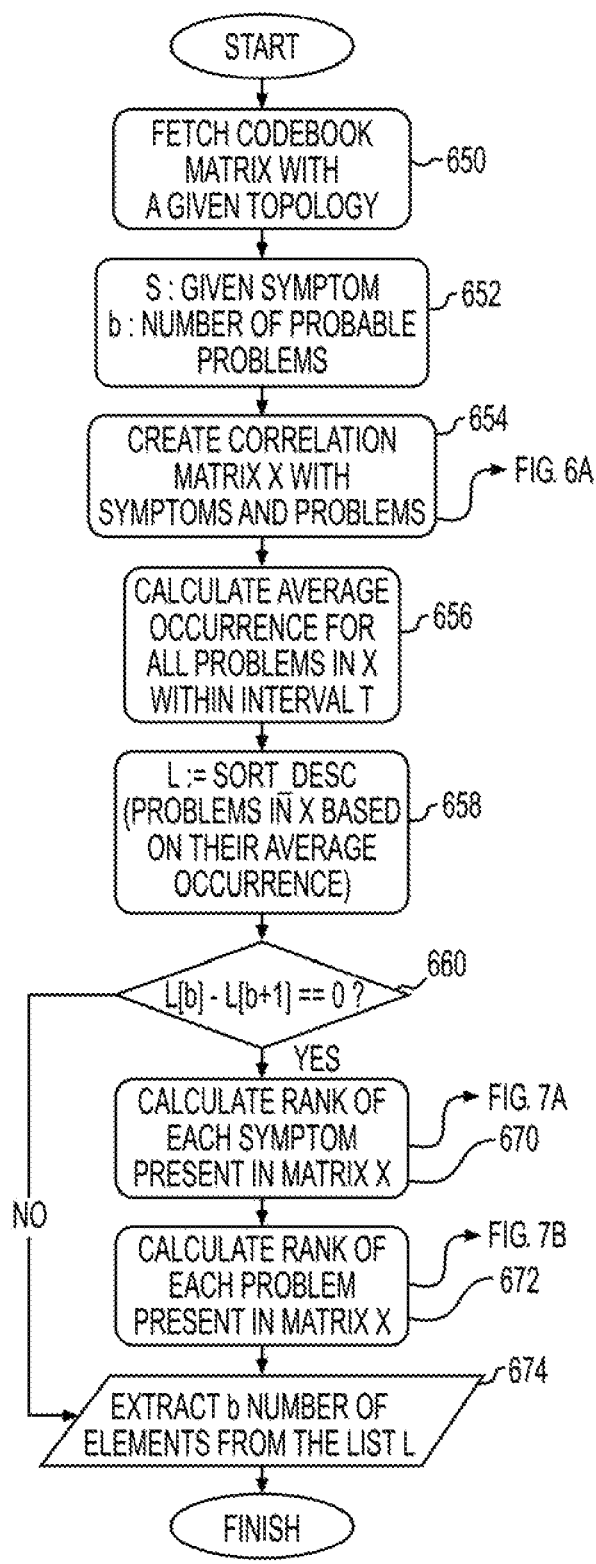
FIG. 6B is a flowchart of an example method for isolating a reduced number of synthetic signatures for a symptom.

Turning to FIG. 6B, an example method for isolating the synthetic failure signatures is shown. At stage 650, the impact assessment engine 340 can fetch a codebook matrix. In one example, the codebook matrix can correspond to a given topology. For example, different topology graphs can be maintained for different tenants or geographic areas of the Telco network, in an example.

At stage 652, inputs to the system can include a symptom and a maximum number for probable problems b. The probable problems maximum can limit the number of impacts reported to a manageable and usable level.

At stage 654, the impact assessment engine 340 can create a correlation matrix X. For example, the stages previously described with regard to FIG. 6A can be used to create the correlation matrix X. The correlation matrix X can then be used to isolate the most relevant (e.g., probable) problems. In this example, the isolation process uses the correlation matrix X. However, in other examples, the codebook matrix C can be used.

At stage 656, the impact assessment engine 340 can calculate average occurrence for all problems in the correlation matrix during a time period. The time period can be, for example, a day or a week. The problems can then be sorted at stage 658 based on how often they occur relative to one another. For example, the problems of Table 1, previously discussed, can be initially sorted based on the number of times they occurred within the time interval, such that P1 occurred the most times.

When the last problem in the ranked list meeting the maximum b has the same rate of occurrence as the next problem (b+1), the impact assessment engine 340 can break the tie by ranking symptoms and problems. To do this, another loop can begin at stage 660. For example, the impact assessment engine 340 can check whether two adjacent problems (of synthetic failure signatures) in a list have the same average appearance L (e.g., L[b]−L[b+1]=0, where b is an index). If so, then the impact assessment engine 340 can calculate the rank of the symptoms in the correlation matrix X at stage 670, which is explained in more detail with regard to FIG. 7A. The ranking can be based on how often the symptom occurs in the matrix. In one example, the ranking value of each symptom is an occurrence count for that symptom. After ranking the symptoms, at stage 672 the impact assessment engine 340 can rank each problem in the correlation matrix X. This can be done, in one example, by summing the ranking values of the symptoms in the synthetic failure signatures, in an example. This process is explained in more detail in FIG. 7B. At stage 674, the maximum number of synthetic failure signatures can be extracted from the correlation matrix (e.g., based on the number b). The impacts can be identified based on those isolated synthetic failure signatures.

The impacts can also be displayed with an estimated cost of failure. For example, Equation 3 below can be used to determine cost of failure.

$$\text{Cost of failure} = \text{(Revenue/total business hours} * W_{P_I} * \text{downtime)} \qquad \text{Equation 3}$$

As an example, if revenue is $1,000,000 and total business hours are 8,760 (365*24), then the problems from Table 4 can be represented as shown in Table 5 below.

TABLE 5

| Priority | Problem | Cost of failures (1 hr) | Cost of failures (2 hr) |
| --- | --- | --- | --- |
| 1 | P3 | $21,090 | $42,180 |
| 2 | P4 | $19,950 | $39,900 |
| 3 | P2 | $17,100 | $34,200 |
| 4 | P1 | $16,530 | $33,060 |

In another example, different estimate downtimes can be assigned to different problems. This can help prioritize the problems differently based on Equation 3 rather than strictly based on the rankings of the isolated synthetic failure signatures.

Figure 7A:
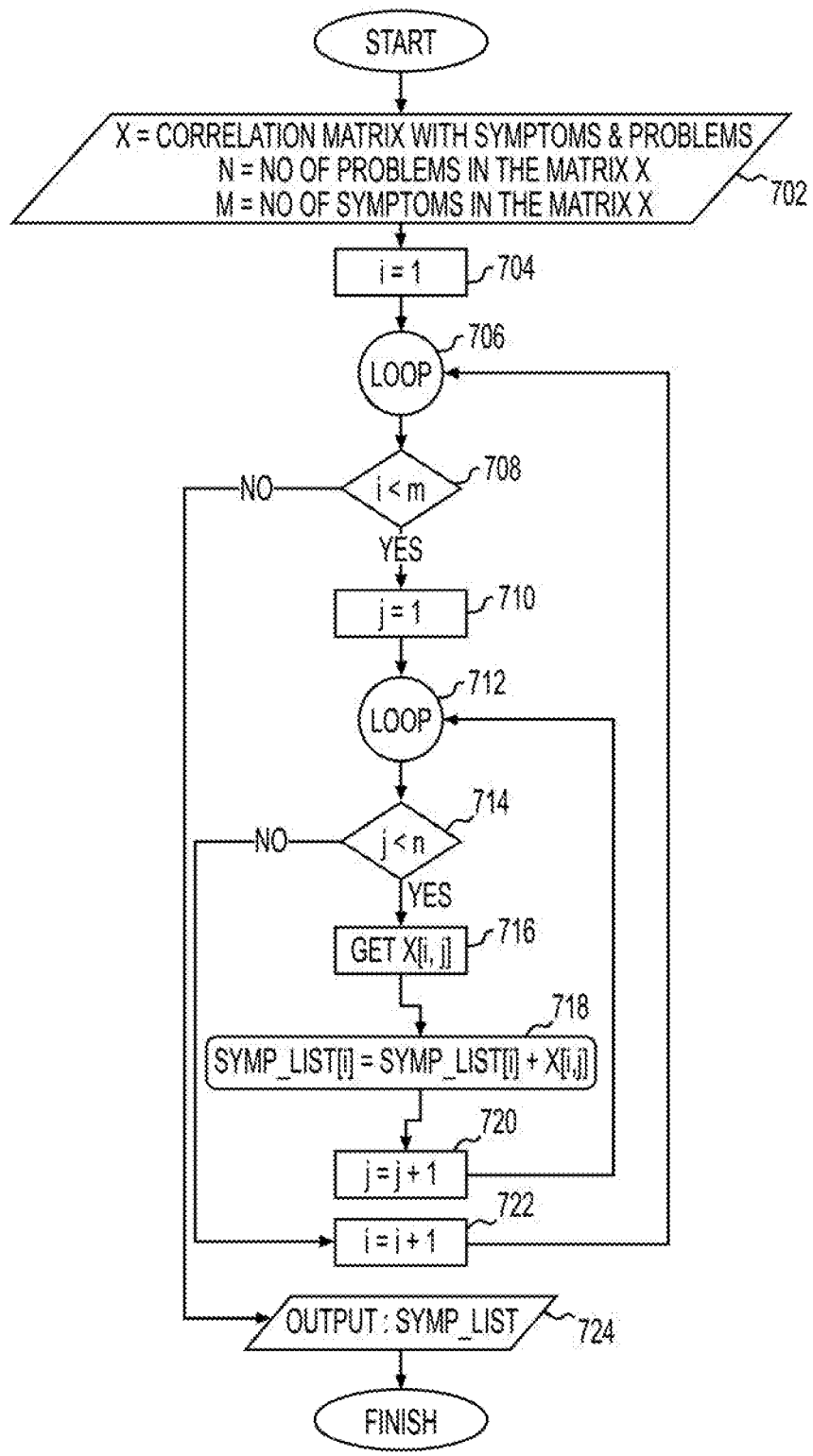
FIG. 7A is a flowchart of an example method for ranking symptoms of a set of synthetic signatures.

FIG. 7A is an example method for ranking symptoms when the occurrence rate of problems is the same or below a threshold difference. At stage 702, the impact assessment engine 340 can start by defining "n" as the number of problems in the correlation matrix X. Similarly, "m" can be defined as the number of symptoms in the correlation matrix.

With an index "i" set to 1 at stage 704, an outer loop can begin at stage 706. When the index "i" is less than the number of symptoms at stage 708, another index "j" can be set to 1 at stage 710. An inner loop can begin at stage 712. Between the inner and outer loops, at stages 714, 716, 718, and 720, the impact assessment engine 340 can inspect each symptom to count how many times the symptom appears in the correlation matrix X. This can include summing each row of the correlation matrix, in an example. For example, at stage 718, the value of the cell X[i,j] can be added to a running total for the row i, with j increasing until reaching the total number of problems (e.g., columns) in the correlation matrix. Then the outer index i increases at stage 722, effectively moving to the next symptom, and the inner loop for counting the symptom occurrences repeats. At stage 724, the impact assessment engine 340 has determined a list of symptoms and the number of times each occurred.

Figure 7B:
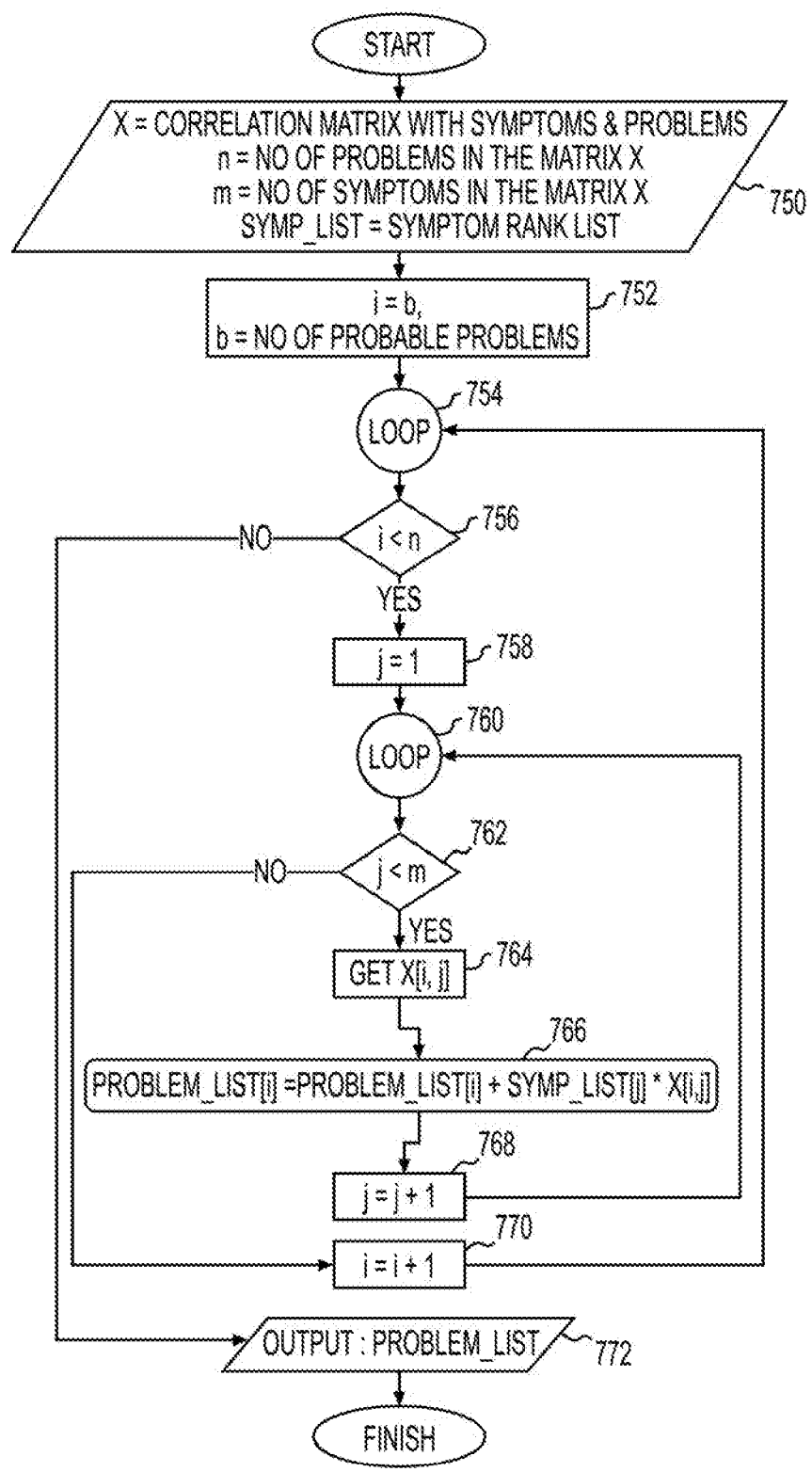
FIG. 7B is a flowchart of an example method for ranking problems of a set of synthetic signatures.

FIG. 7B is an example method for ranking problems based on the symptom list generated, for example, according to FIG. 7A. The methodology can perform the determinations previously described with reference to Equation 2, in an example.

At stage 750, the impact assessment engine 340 can retrieve the number "n" of problems in the correlation matrix X, the number "m" of symptoms in the correlation matrix X, and the symptom list. At stages 752 and 754, an outer loop can begin. The outer loop can continue at stage 756 while the index is less than the number of problems in the correlation matrix. The outer loop can traverse the problems, while an inner loop at stages 758, 760, 762 can traverse the symptoms of each problem. For each symptom identified in the inner loop, at stages 764 and 766 the impact assessment engine 340 can add the number of occurrences of that symptom to a rank total for the problem. Table 3, above, provides an example. The number of occurrences of each system can be retrieved from the symptom list, in an example. The inner loop can repeat this summation for all the symptoms of a problem by incrementing the inner counter at stage 768. An outer counter at stage 770 can increment to move to the next problem.

At stage 772, the resulting problem list can include ranking totals for each problem. The problems can then be sorted based on a descending order of ranking totals, in an example. In one example, the sorting only applies to adjacent problems that have the same rate of occurrence or that are within a threshold difference with regard to rate of occurrence. In this way, the ranking of synthetic failure signatures can account for both the rate at which a problem occurs and the relative occurrence levels of the problem's symptoms.

Using the ranked synthetic failure signatures, the impact assessment engine 340 can isolate a subset based on the maximum number problems b. Again, this maximum can be specified in advance by an administrator or an automated process, depending on the example. Using the problem from each of the isolated synthetic failure signatures, the impact assessment engine 340 can identify a corresponding network resource. From the identified network resources, the impact assessment engine 340 can use the topology graph to determine the impacted services and tenants. These predicted impacts can then be displayed on a GUI or sent to an automated process for use in automated remediation strategy.

Figure 8:
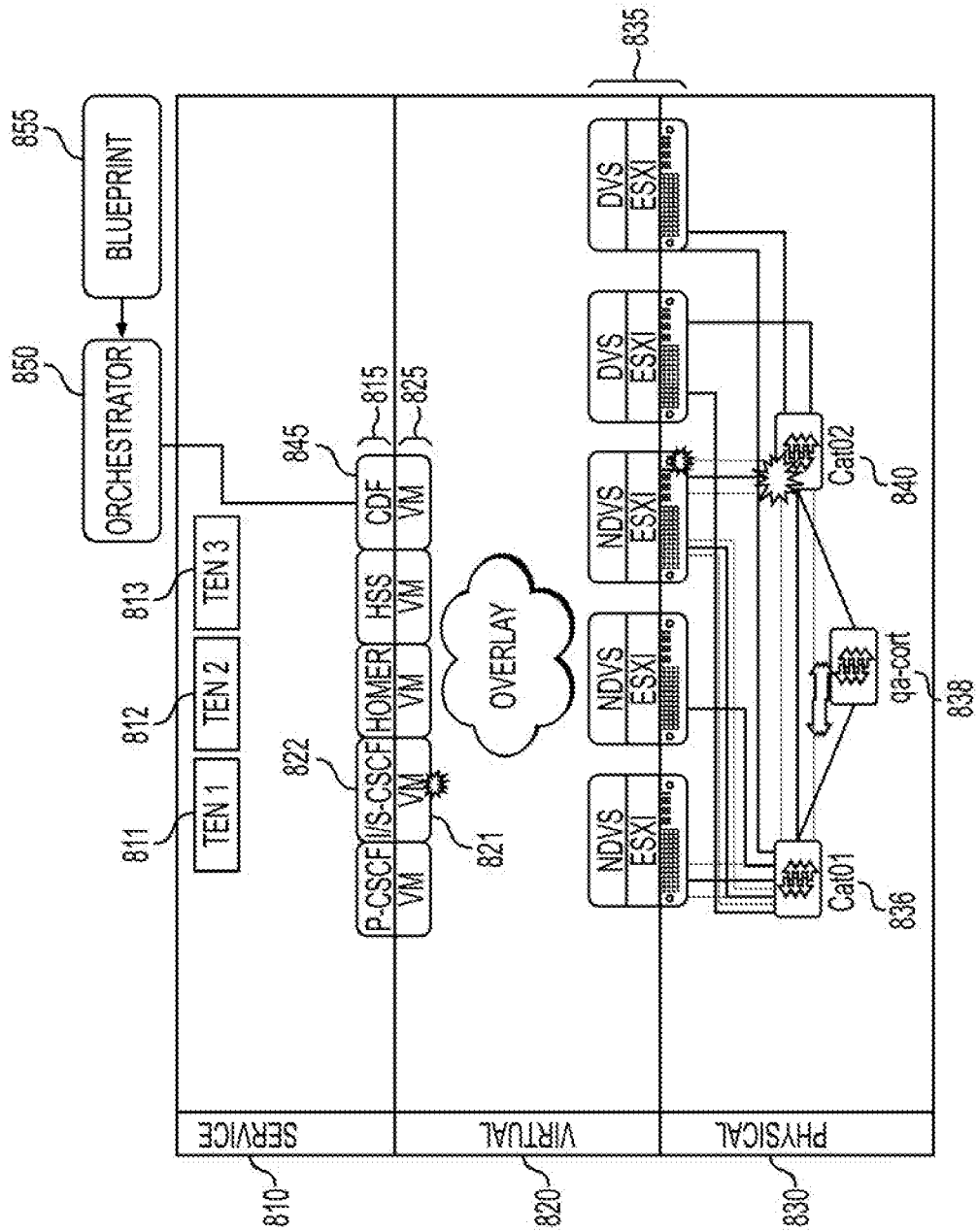
FIG. 8 is an example system diagram including components of a Telco network.

FIG. 8 is an example system diagram showing components that can be used for predicting impacts based on a scenario in a Telco network. The Telco network can include a physical layer 830, virtual layer 820, and service layer 810. The physical layer can include servers 835, upon which virtual layer 820 network resources can run. The virtual layer can include a virtual overlay upon which virtual resources like VMs 825 and VNFs can run. In this example, the virtual layer also includes virtual switches NDVS and DVS. The virtual switches can run on top of hypervisors ESXI, another type of virtual resource. These virtual resources can all run on top of the physical layer, such as servers 835.

Services 815 can run on the VMs 825. The services 815 can be part of the service layer 810 in an example. These services 815 can serve multiple tenants 811, 812, 813, in an example. For example, the tenants 811, 812, 813 can run various applications on the VMs 825 for any number of purposes.

An orchestrator 850 can monitor network health and be responsible for deploying network resources in the virtual and service layers 820, 810. The orchestrator 850 can do so based on a blueprint 855. The blueprint 855 can describe which network resources to deploy and where, in an example. The orchestrator 850 can be a process that executes as part of the network or separately from the network. In one example, the orchestrator 850 includes the impact assessment engine 340. Alternatively, the impact assessment engine 340 can run as a service 845 in the network that communicates with the orchestrator 850.

The network resources in the different layers 810, 820, 830 can all be impacted by problems in other layers. For example, the hypervisors and virtual switches (virtual resources) can be impacted by problems at the underlying servers 835. In addition, the virtual switches can impact VM 825 functionality. These in turn can impact how the services 815 run. These problems can run in the opposite direction as well, with virtual layer issues impacting the physical layer. For example, a malfunctioning set of VMs can overburden memory requirements in a physical server.

Within the physical layer, the physical devices (e.g., servers 835) can be connected with physical entities 836, 838, 840. These physical entities can be physical routers and network interfaces. In this example, a problem occurs at network interface 840. This problem can impact the other physical and virtual resources, some of which may report symptoms and be included as impacted network resources in the problem notification. For example, the VM 821 may malfunction based on network problems at the network interface 840. The impacted VM 821 can report a symptom to the analytics engine in an example. A service 822 that relies on the VM 821 can similarly report symptoms to the analytics engine. Coupled with an alert from the network interface 840, the analytics engine can issue a problem notification. The problem can originate at network interface 840 (a physical entity) and include impacted network resources VM 821 (a virtual entity) and service 822 (service degradation).

The impact assessment engine 340 can receive multiple such problem notifications. The impact assessment engine 340 can use the problem notifications to create a codebook matrix 500. Then, as has been described, the impact assessment engine 340 can receive a scenario 540 and use the codebook matrix 500 to predict impacts of the scenario 540. The predicted impacts can be displayed on a GUI.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for impact assessment in a Telco network, comprising:

receiving, at an impact assessment engine, a scenario that specifies a symptom for a network resource, wherein the symptom describes a state of the network resource;

constructing failure signatures in a codebook matrix, wherein the codebook matrix correlates problems at impacted network resources to symptoms at other network resources;

generating synthetic failure signatures by identifying problems in the codebook matrix that include the symptom and network resource of the scenario;

isolating a subset of the synthetic failure signatures that meet a ranking threshold, wherein the failure signatures are ranked based on at least problem occurrence frequency; and identifying, on a graphical user interface ("GUI"), potentially impacted tenants and services for the scenario, wherein the tenants and services correspond to the impacted network resources of the subset of synthetic failure signatures.

2. The method of claim 1, wherein generating synthetic failure signatures includes creating a correlation matrix of problems and symptoms based on columns from the codebook matrix that include the symptom of the scenario.

3. The method of claim 2, wherein isolating the subset includes:

determining that first and second problems do not exceed a threshold difference in problem occurrence frequency;

for each of the symptoms of the first and second problems, creating symptom counts that represent the number of times the symptom exists in the correlation matrix; and for each of the first and second problems, creating problem sums by summing the symptom counts for symptoms corresponding to the problem; and ranking the first and second problems based which has a highest problem sum.

4. The method of claim 2, wherein the correlation matrix is reduced by removing rows that represent no active symptoms.

5. The method of claim 1, wherein identifying tenants and services includes using a network topology graph to determine tenants and services that use the impacted network resources.

6. The method of claim 1, wherein the impacted tenants and services are identified in an alert on the GUI.

7. The method of claim 1, wherein the scenario and a maximum number of synthetic failure signatures are specified by inputs on the GUI, and wherein the ranking threshold of the isolated subset is based on the maximum number.

8. A non-transitory, computer-readable medium comprising instructions that, when executed by a processor, perform stages for impact assessment in a Telco network, the stages comprising:

receiving, at an impact assessment engine, a scenario that specifies a symptom for a network resource, wherein the symptom describes a state of the network resource;

constructing failure signatures in a codebook matrix, wherein the codebook matrix correlates problems at impacted network resources to symptoms at other network resources;

generating synthetic failure signatures by identifying problems in the codebook matrix that include the symptom and network resource of the scenario;

isolating a subset of the synthetic failure signatures that meet a ranking threshold, wherein the failure signatures are ranked based on at least problem occurrence frequency; and identifying, on a graphical user interface ("GUI"), potentially impacted tenants and services for the scenario, wherein the tenants and services correspond to the impacted network resources of the subset of synthetic failure signatures.

9. The non-transitory, computer-readable medium of claim 8, wherein generating synthetic failure signatures includes creating a correlation matrix of problems and symptoms based on columns from the codebook matrix that include the symptom of the scenario.

10. The non-transitory, computer-readable medium of claim 9, wherein isolating the subset includes:

determining that first and second problems do not exceed a threshold difference in problem occurrence frequency;

for each of the symptoms of the first and second problems, creating symptom counts that represent the number of times the symptom exists in the correlation matrix; and for each of the first and second problems, creating problem sums by summing the symptom counts for symptoms corresponding to the problem; and ranking the first and second problems based which has a highest problem sum.

11. The non-transitory, computer-readable medium of claim 9, wherein the correlation matrix is reduced by removing rows that represent no active symptoms.

12. The non-transitory, computer-readable medium of claim 8, wherein identifying tenants and services includes using a network topology graph to determine tenants and services that use the impacted network resources.

13. The non-transitory, computer-readable medium of claim 8, wherein the impacted tenants and services are identified in an alert on the GUI.

14. The non-transitory, computer-readable medium of claim 8, wherein the scenario and a maximum number of synthetic failure signatures are specified by inputs on the GUI, and wherein the ranking threshold of the isolated subset is based on the maximum number.

15. A system for impact assessment in a Telco network, comprising:

a non-transitory, computer-readable medium containing instructions; and a processor that executes the instructions perform stages comprising:

receiving, at an impact assessment engine, a scenario that specifies a symptom for a network resource, wherein the symptom describes a state of the network resource;

constructing failure signatures in a codebook matrix, wherein the codebook matrix correlates problems at impacted network resources to symptoms at other network resources;

generating synthetic failure signatures by identifying problems in the codebook matrix that include the symptom and network resource of the scenario;

isolating a subset of the synthetic failure signatures that meet a ranking threshold, wherein the failure signatures are ranked based on at least problem occurrence frequency; and identifying, on a graphical user interface ("GUI"), potentially impacted tenants and services for the scenario, wherein the tenants and services correspond to the impacted network resources of the subset of synthetic failure signatures.

16. The system of claim 15, wherein generating synthetic failure signatures includes creating a correlation matrix of problems and symptoms based on columns from the codebook matrix that include the symptom of the scenario.

17. The system of claim 16, wherein isolating the subset includes:

determining that first and second problems do not exceed a threshold difference in problem occurrence frequency;

for each of the symptoms of the first and second problems, creating symptom counts that represent the number of times the symptom exists in the correlation matrix; and for each of the first and second problems, creating problem sums by summing the symptom counts for symptoms corresponding to the problem; and ranking the first and second problems based which has a highest problem sum.

18. The system of claim 16, wherein the correlation matrix is reduced by removing rows that represent no active symptoms.

19. The system of claim 15, wherein identifying tenants and services includes using a network topology graph to determine tenants and services that use the impacted network resources.

20. The system of claim 15, wherein the scenario and a maximum number of synthetic failure signatures are specified by inputs on the GUI, and wherein the ranking threshold of the isolated subset is based on the maximum number.

\* \* \* \* \*